United States Patent
Lebreton et al.

(10) Patent No.: US 12,138,756 B2
(45) Date of Patent: Nov. 12, 2024

(54) TORQUE WRENCH FOR CONNECTING A REPLACEABLE INSTRUMENT TIP TO A HAND PIECE, SYSTEM COMPRISING A TORQUE WRENCH AND AN INSTRUMENT TIP AND METHOD FOR CONNECTING AN INSTRUMENT TIP TO A HAND PIECE

(71) Applicant: FERTON HOLDING S.A., Delémont (CH)

(72) Inventors: Etienne Lebreton, Crissier (CH); Maxime Fournier, Lausanne (CH)

(73) Assignee: FERTON HOLDING S.A., Delémont (CH)

( * ) Notice: Subject to any disclaimer, the term of this patent is extended or adjusted under 35 U.S.C. 154(b) by 594 days.

(21) Appl. No.: 17/291,490

(22) PCT Filed: Nov. 22, 2019

(86) PCT No.: PCT/EP2019/082229
§ 371 (c)(1),
(2) Date: May 5, 2021

(87) PCT Pub. No.: WO2020/104655
PCT Pub. Date: May 28, 2020

(65) Prior Publication Data
US 2022/0001520 A1    Jan. 6, 2022

(30) Foreign Application Priority Data
Nov. 23, 2018 (EP) ..................................... 18208073

(51) Int. Cl.
*B25B 23/142* (2006.01)
*A61C 1/14* (2006.01)
(Continued)

(52) U.S. Cl.
CPC .......... *B25B 23/1427* (2013.01); *A61C 1/145* (2013.01); *B25B 13/48* (2013.01); *B25B 23/141* (2013.01); *A61C 17/20* (2013.01)

(58) Field of Classification Search
CPC ..... A61C 1/145; A61C 17/20; B25B 23/1427; B25B 13/48; B25B 23/141
See application file for complete search history.

(56) References Cited

U.S. PATENT DOCUMENTS 5,197,876 A * 3/1993 Coston ...................... A61C 1/16
433/116
6,186,785 B1 * 2/2001 Rogers ................. A61C 8/0089
433/141

(Continued)

FOREIGN PATENT DOCUMENTS

JP     S58157120 A    10/1983
JP     2003033373 A    2/2003

OTHER PUBLICATIONS

International Preliminary Report on Patentability for corresponding application PCT/EP2019/08229 filed Nov. 22, 2019; Report dated May 25, 2021.

(Continued)

*Primary Examiner* — Nicholas D Lucchesi
(74) *Attorney, Agent, or Firm* — CANTOR COLBURN LLP (57) ABSTRACT

Torque wrench for connecting a replaceable instrument tip to a hand piece that carries the replaceable instrument tip in operation, a base element having a receiving region for placing the instrument tip inside the receiving region at least during connecting the instrument tip to the hand piece, a torque wrench mechanism for applying a certain torque when connecting the instrument tip to the hand piece and a housing surrounding the instrument tip being arranged in the receiving region, the housing being preferably transparent, (Continued)

wherein the torque wrench has a guiding structure for aligning the torque wrench relative to the hand piece during arranging the torque wrench on the hand piece, in particular in an interface region of the hand piece, and/or where the housing has an inner surface and an outer surface being concentric to each other over a complete primary region extending at least from the base element to the end of the instrument tip, when the torque wrench is equipped with the instrument tip.

13 Claims, 4 Drawing Sheets

(51) Int. Cl.
    *B25B 13/48*           (2006.01)
    *B25B 23/14*           (2006.01)
    *A61C 17/20*           (2006.01)

(56) References Cited

U.S. PATENT DOCUMENTS

| | | | |
|---|---|---|---|
| 7,100,476 B1 | 9/2006 | Feit | |
| 8,065,940 B2 * | 11/2011 | Wilson | B25B 23/1427 |
| | | | 81/475 |
| 8,327,740 B2 * | 12/2012 | Rasmussen | B25B 23/0007 |
| | | | 81/477 |
| 8,430,868 B2 * | 4/2013 | Edgell | A61N 1/3752 |
| | | | 606/1 |
| 8,490,525 B2 * | 7/2013 | Wilson | B25B 23/1427 |
| | | | 81/475 |
| 9,301,772 B2 * | 4/2016 | Kimball | A61B 17/320092 |
| 2004/0055425 A1 | 3/2004 | Casabonne | |
| 2006/0123958 A1 | 6/2006 | Jamnia | |
| 2008/0153059 A1 | 6/2008 | Schaffran | |
| 2018/0141132 A1 * | 5/2018 | Berg | B23C 5/26 |

OTHER PUBLICATIONS

European Examination Report for corresponding application 19 805 696.2; Report dated Feb. 28, 2023.
International Search Report for corresponding application PCT/EP2019/082229 filed Nov. 22, 2019; Mail date Jan. 21, 2020.
Written Opinion of the International Searching Authority for corresponding application PCT/EP2019/082229 filed Nov. 22, 2019; Mail date Jan. 21, 2020.

* cited by examiner

TORQUE WRENCH FOR CONNECTING A REPLACEABLE INSTRUMENT TIP TO A HAND PIECE, SYSTEM COMPRISING A TORQUE WRENCH AND AN INSTRUMENT TIP AND METHOD FOR CONNECTING AN INSTRUMENT TIP TO A HAND PIECE

TECHNICAL FIELD

The present disclosure concerns a torque wrench for connecting a replaceable instrument tip to a hand piece, a system comprising a torque wrench and an instrument tip and a method for connecting an instrument tip to a hand piece.

BACKGROUND

It is well known, for example from US 2006/0 123 958 A1, to use a torque wrench for connecting a replaceable instrument tip to a hand piece. For example, the instrument is a dental instrument, and the instrument tip is a scaling tip that is used for removing plaque and/or tartar from teeth by scaling. Replaceable instrument tips allow applying types of instruments differing from each other with respect to their specifications and/or their use status by using one common hand piece. However, for avoiding damages of the instrument tip and/or hand pieces by applying an inappropriate high torque during connecting, the torque wrench limits the torque used for connecting the instrument tip and the hand piece on one hand. On the other hand the torque wrench makes sure that the instrument tip is not connected to the hand piece too loose. For example, the torque wrench guarantees a proper connection of the instrument tip and the hand piece for transferring an ultrasonic movement generated by an activator unit of the hand piece to the instrument tip.

Usually, it is provided that the torque wrench is equipped with the instrument tip that is about to be used by the hand piece. Subsequently, the instrument tip is fixed to the hand piece by using the torque wrench.

Further, it is known to provide a transparent housing surrounding the instrument tip being mounted on or attached to the torque wrench, wherein the housing is structured at its out-side in order to improve gripping the torque wrench during connecting the instrumental tip to the hand piece. The transparent housing allows identifying the instrument tip being currently equipped to the torque wrench by looking through the housing.

BRIEF SUMMARY

The disclosure provides a torque wrench being further improved compared to the known torque wrenches from the state of the art, preferably in view of their handling and their support to identify the instrument tip being currently equipped to the torque wrench.

According to the disclosure, a torque wrench for connecting a replaceable instrument tip, such as a scaling tip for example, to a hand piece that carries the replaceable instrument tip in operation, preferably to form a dental instrument, is provided, comprising a base element having a receiving region for placing the instrument tip inside the receiving region at least during connecting, a torque wrench mechanism for applying a certain torque when connecting the instrument tip to the hand piece and a housing surrounding the instrument tip being arranged at the receiving region, the housing being preferably transparent, wherein the torque wrench has a guiding structure for aligning the instrument tip during inserting the instrument tip into the receiving region, and wherein the guiding structure tapers along an insertion direction being parallel to a longitudinal direction of the receiving region and/or parallel to the inner or outer side of the housing, wherein preferably the guiding structure has a concave shape, for example a conical shape.

Thus, it is possible to realize a contact between the guiding structure and the instrument tip, wherein the contact supports aligning, when the instrument tip is moved towards to the receiving region. Furthermore, the insertion direction corresponds to a longitudinal direction of the base body of the instrument tip, being fixed to the receiving region. Due to the tapered structure of the second front side, the torque wrench can be shifted in a direction slanted or even perpendicular to the insertion direction or longitudinal direction of the receiving region. As a consequence, a probability for injuring the user during depositing the torque wrench on the hand piece is reduced and the user might even insert the instrument tip with closed eyes. Furthermore, it is provided that the guiding structure is part of the second front side of the base element.

Preferably, the housing has an inner surface and outer surface being parallel to each other over a complete primary region extending from the base element to at least an end of the instrument tip, in particular pointed at the end of the instrument tip, when the torque wrench is equipped with the instrument tip.

In contrast to the state of the art, the torque wrench according to the present disclosure has an inner surface and an outer surface being fully parallel to each other over the complete primary region, in particular along a complete circumference surrounding the instrument tip, i. e. 360° and in particular concentric to each other. As a consequence, when the housing is transparent, there is no beam displacement, when the user takes a look at the instrument tip through the transparent housing. Therefore, no distorted image is visually detected by a user that tries to identify the instrument tip being arranged at the receiving region of the torque wrench. This supports the user to quickly identify the instrument tip equipped to the torque wrench. Contrary, these distorted images are realized by such housings known from the prior art that has a structured outer surface in order to simplify gripping the torque wrench. Further, the guiding structure of the present disclosure supports the user by inserting the instrument tip into the receiving region. In particular, the guiding structure is configured such that the instrument tip is shifted, for example laterally, to the proper position by the guiding structure, when the instrument tip is moved towards the receiving region. Thus, it is possible to support the handling of the torque wrench when it is equipped with the instrument tip and reduce a probability to injure the user by the instrument tip during aligning the instrument tip relatively to the hand piece.

Preferably, the housing surrounds the instrument tip being arranged at the receiving area such that the housing surrounds the complete instrument tip and/or is arranged concentrically to the instrument tip. Thus, the housing protects the instrument tip and the user against injury by the instrument tip. For example, the housing is cylindrical and has openings at its front ends. In particular, the primary region extends over the whole housing. Furthermore, the receiving area is configured as a recess, in particular a recess in form of a hole reaching through the complete base element, wherein the base element has a first front side and a second front side being opposite to the first front side. The shape of the recess in a plane being parallel of the first front side and/or the second front side corresponds to a base body of the instrument tip that is arranged inside the base element. In particular, the base body of the instrument tip and the base element of the torque wrench are configured complementary, for example in a sense of a key-lock principle. The base element has a mainly cylindrical shape being surrounded by the housing. Furthermore, the base element comprises the torque wrench mechanism, such as a torque wrench mechanism disclosed in US 2006 0 123 958 A1, of which content related to the torque wrench mechanism is explicitly referred to herewith.

According to a preferred embodiment it is provided that a first length is assigned to the primary region extending from the base element to at least the end of the instrument tip and a second length is assigned to a maximal width or distance of an opening defined by the inner surface, wherein the second length is larger than the first length, in particular the second length is 1 to 6 times, preferably 1.2 to 2.5 times and more preferably 1.3 to 1.8 times bigger than the first length. As a consequence, a comparable large first front side of the base element is provided that simplifies looking from a top view perspective. Furthermore, it is possible to provide information regarding the instrument tip and/or the torque wrench on the first front side. Furthermore the primary region extends from the first front side to the end of the housing, in particular the end of the housing being located on the side of the end of the instrument tip protruding from the first front side.

In another preferred embodiment of the present disclosure it is provided that the torque wrench is individualized for connecting to a certain type of instrument tip. Thus, it is advantageously possible to use the torque wrench only for one type of instrument tip or a group of instrument tips such that information relating to the instrument tip, such as its identification number, can be placed or located on the torque wrench. Preferably, the individualizing is realized by the key lock principle between the base body of the instrument tip and the base element of the torque wrench. For example, the size and/form of the recess forming the receiving region is adapted correspondingly.

According to a further preferred embodiment of the disclosure, it is provided that the torque wrench has an identification, such as a sign, for visually identifying the instrument tip inserted into the torque wrench. Thus, it is possible to simplify identifying the type of the instrument tip in use. For example, an identification information is engraved into the torque wrench, in particular in the base element or a secondary region of the housing that differs from the primary region of the housing. It is also conceivable that the information is located on the first front side. Another possibility might be using a color code such that the color code corresponds to a certain type of instrument tip and the housing and/or the base element of the torque wrench is colored correspondingly, wherein the housing is preferably still transparent.

In another preferred embodiment of the present disclosure, the housing is at least partially free, preferably fully free, from deformations. Thus, it is advantageously possible to avoid a distorted view on the instrument tip and/or the torque wrench mechanism by looking through the housing. It also conceivable to include at least one deformation in a secondary region of the housing being different from the primary region. For example, the secondary region extends from the first front side to at least the second front side of the base element. Thus, it is advantageously possible to have deformation supporting gripping in a region irrelevant for the view on the instrument tip. Another benefit is that the user gets to grip the housing in the secondary region. As a consequence, a probability for soiling the housing in the primary region by finger prints is reduced. Another benefit of a complete transparent housing without any deformation is supporting the user by identifying possible dust residues. As a consequence, an optimal hygiene and trans-contamination is guaranteed.

According to another embodiment of the present disclosure, it is provided that the torque wrench has a reference marking for determining a status of the instrument tip connected to the receiving region. Thus, it is possible for the user to identify the current status of the instrument tip. In particular it is provided that the reference marking is a reference for identifying the length of the instrument tip. In particular, a projection of the instrument tip on the reference marking, preferably from a defined point of view, can be used for identifying the use status of the instrument tip. Preferably, the reference marking is located on the first front side of the base element of the torque wrench and the user needs to look from a defined top view perspective, such as located around 30 cm from the first front side, along a direction perpendicular to the first front side.

According to a preferred embodiment, it is provided that a reference marking is a ring, in particular extending concentrically to the inner surface, the outer surface and/or the receiving region. Preferably, the ring is dimensioned such that a thickness of the ring measured radially supports identifying the use status of the instrument tip. In particular, the ring is configured such that a projection of the instrument tip onto the reference marking extends radially to the outer circle of the ring, when the instrument tip is new. When the instrument tip is shortened to a critical limit, the projection of the instrument tip on the reference marking extends only to the inner circle. As soon as the inner circle is reached the instrument tip should be changed.

Preferably, the torque wrench is made from a material being compatible with a sterilization method used for the instrument tip. As a consequence, it is possible to sterilize the instrument tip, when it is mounted to the torque wrench, together with the torque wrench without removing the instrument tip from the torque wrench. The sterilization might be performed manually, for example by using an ultrasound bath. It is also conceivable that the sterilization is performed semi automatically, by using a thermodesinfication machine, or automatically in a device designed for cleaning and sterilizing. For example, the torch wrench and the instrument tip are exposed to a steam, chemicals and/or temperatures that supports sterilization and/or disinfection of the instrument tip.

Preferably, the instrument tip is an integral part of the torque wrench. Thus, there is no need for mounting the instrument tip to the torque wrench. Instead, the torque wrench is part of the dental instrument, when the instrument tip is arranged on the hand piece and only the housing is removed for the treatment.

In another preferred embodiment is provided that the housing has a secondary region surrounding the base element, wherein a third length is assigned to the secondary region that is smaller than a complete height of the base element. Consequently, the base element protrudes relatively to the housing and the protruding part of the base element can be used for realizing an identification such as a label. Further, the user can grip a part of the torque wrench being arranged next to the interface area of the torque wrench and thus simplifies handling, in particular when the torque wrench is moved relatively to the hand piece.

Another aspect of the present disclosure is a system comprising a torque wrench according to the disclosure and an instrument tip for a hand piece. Preferably, the torque wrench being equipped with the instrument tip is stored in a tray of sachet.

Preferably, the hand piece comprises
an activator unit for activating a movement, in particular an ultrasonic movement, of the instrument tip connected to the hand piece and/optionally
a cooling unit, preferably in form of a cooling circuit.

In particular, the activator unit generates an ultrasonic movement of 18,000 Hz to 32,000 Hz.

Another aspect of the present disclosure refers to a method for connecting an instrument tip and a hand piece that carries the replaceable instrument tip in operation defined by a torque wrench according to the present disclosure, comprising
locating the instrument tip inside the receiving area of the torque wrench and/or
connecting and/or disconnecting the replaceable tip and the hand piece by applying a certain torque defined by the torque wrench.

Another aspect of the present disclosure refers to a torque wrench for connecting a replaceable instrument tip, such as a scaling tip for example, to a hand piece that carries the replaceable instrument tip in operation, preferably to form a dental instrument, is provided, comprising
a base element having a receiving region for placing the instrument tip inside the receiving region at least during connecting,
a torque wrench mechanism for applying a certain torque when connecting the instrument tip to the hand piece and
a transparent housing surrounding the instrument tip being arranged at the receiving region,
wherein the transparent housing has an inner surface and outer surface being parallel to each other over a complete primary region extending from the base element to at least an end of the instrument tip, in particular pointed at the end of the instrument tip, when the torque wrench is equipped with the instrument tip.

Wherever not already described explicitly, individual embodiments or their individual aspects and features can be combined or exchanged with one another without limiting or widening the scope of the described disclosure, whenever such a combination or exchange is meaningful and in the sense of this disclosure. Advantages which are described with respect to one embodiment of the present disclosure are, wherever applicable, also advantageous of other embodiments of the present disclosure.

DETAILED DESCRIPTION

Figure 1:
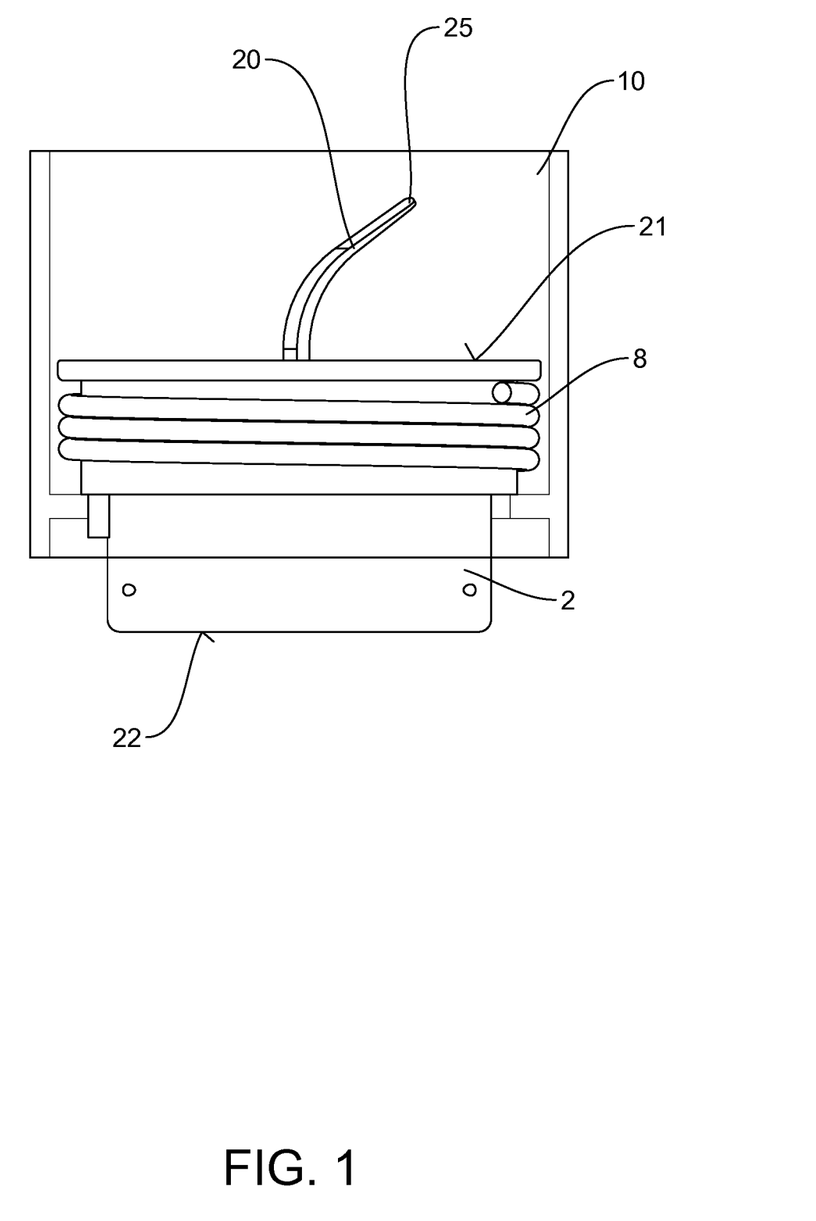
FIG. 1 schematically shows a side view of a torque wrench according to a preferred embodiment of the present disclosure, FIG. 2 schematically shows a cross side view of the torque wrench illustrated in FIG. 1
Figure 2:
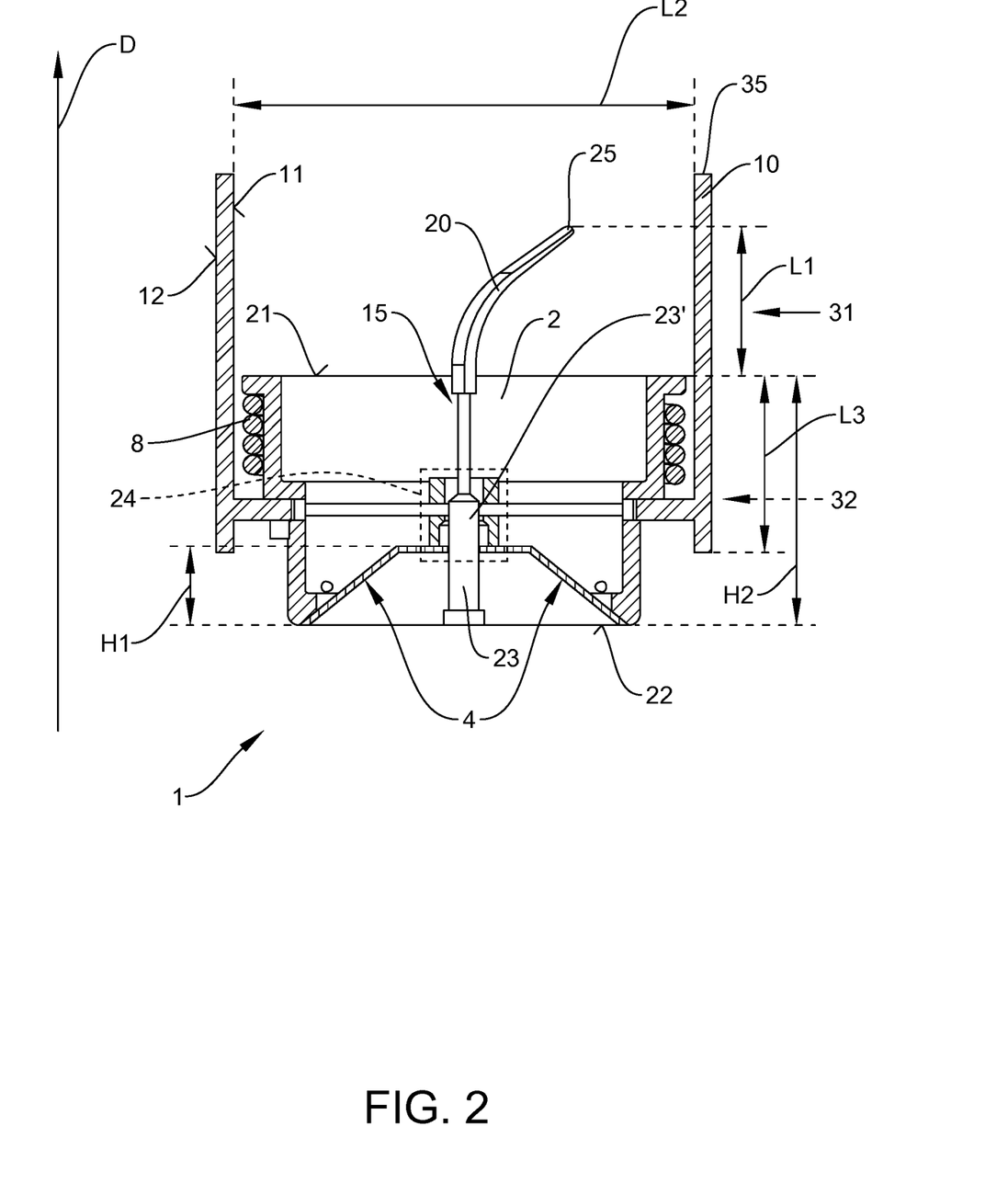
Figure 3:
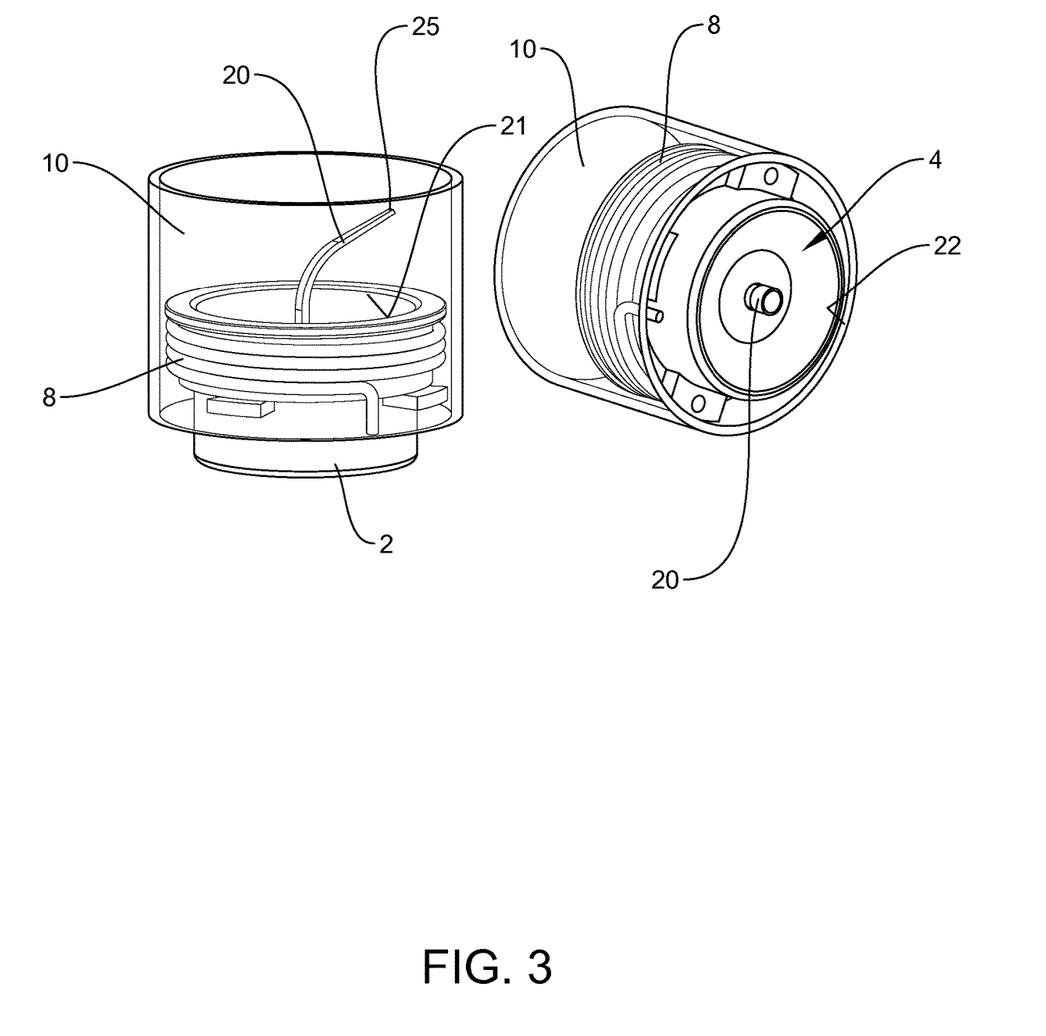
FIG. 3 schematically shows perspective views of the torque wrench illustrated in FIG. 1

In the FIGS. 1 to 3 a torque wrench 1 for connecting a replaceable instrument tip 20 to a hand piece that carries the replaceable instrument tip 20 in operation is shown in a side view (FIG. 1), in a cross sectional view (FIG. 2) and in a perspective view (FIG. 3). For example the replaceable instrument tip 20 is a scaling tip, i. e. an instrument tip 20 that is used to clean teeth by scaling, and in particular in the mounted state the hand piece and the instrument tip 20 form a medical instrument, preferably a dental instrument.

Such an instrument tip 20 might be formed by a cylindrical metallic body that is bend and/or twisted, wherein the metallic body tapers to a sharp or pointed end 25. In operation, i. e. during using the instrument for removing tartar and/or plague from the teeth, the instrument tip 20 is mounted on a hand piece for carrying the instrument tip 20 during the operation, wherein the instrument tip 20 is arranged on one front end of the hand piece (not shown). For removing tartar and/or plague from the teeth the hand piece having the instrument tip 20 is lead to the teeth such that the instrument tip 20 is in contact with the surface of the teeth. Preferably, the hand piece comprises an activator unit for activating a movement, in particular an ultrasonic movement, of the instrument tip 20 connected to the hand piece. This ultrasonic movement supports removing spots, plaque and/or dentine tartar. The instrument tip 20 might be used subgingival or supragingival.

In particular, the hand piece is constructed such that the activator unit transfers the ultrasonic movement to the instrument tip 20 being located at the front end of the hand piece. For example, the activator unit comprises a piezo element for realizing the ultrasonic movement. The hand piece might further comprise a cooling unit such a cooling circuit including a water inlet and/or outlet, for cooling the hand piece during its operation. It also conceivable that the hand piece has a power supply for providing energy to a light source such as a LED.

The scaling during operation typically wears the instrument tip 20 out. Consequently, the instrument tip 20 is a consumption item that is renewed from time to time. Thus, the instrument tip 20 is configured replaceable and is no integral part of the hand piece. Another benefit of a replaceable instrument tip 20 is changing between different types of instrument tips 20 by using the same common hand piece. In particular, the instrument tip 20 and the hand piece are connected to each other via interface areas being respectively assigned to the hand piece and the instrument tip 20.

For connecting the instrument tip 20 to the hand piece and/or for disconnecting the instrument tip 20 a torque wrench 1 is used. As a consequence, it is possible to apply the proper torque that does not destroy the hand piece, in particular a corresponding interface area of the hand piece, and simultaneously guarantees that the instrument tip 20 is connected not too loose for transferring the ultrasonic movement from the hand piece to the instrument tip 20 properly.

The torque wrench 1 presented in FIG. 1 comprises a base element 2 having a recess forming a receiving region 15 for placing the instrument tip 20 inside the receiving region 15. Besides the receiving region 15 the torque wrench 1 has a torque wrench mechanism for applying a certain torque when connecting the instrument tip 20 to the hand piece. In particular, a spring 8 surrounding the base element 2 represents a part of the torque wrench mechanism. Such a torque wrench mechanism is described for example in U.S. Pat. No. 2,006,123 958 A1, of which content concerning the torque wrench mechanism is incorporated explicitly herewith.

In the embodiment presented in FIG. 1 the base element 2 mainly has a cylindrical form, wherein in a mounted state the instrument tip 20 protrudes from a first front side 21 of the cylindrical base element 2, when the torque wrench is equipped with the instrument tip 20 and a second front side 22 opposite to the first front side 21 includes a guiding structure 4 that supports connecting the instrument tip 20 to the hand piece. For equipping the hand piece with a certain instrument tip 20, the instrument tip 20 is inserted inside the hole forming the receiving region 15. In particular, the instrument tip 20 extends through the base element 2, in particular the whole base element 2, when the torque wrench 1 is equipped with the instrument tip 20, wherein preferably the pointed end 25 of the instrument tip 20 faces away from the first front side 21. Furthermore the torque wrench 1 and the instrument tip 20 are connected with each other via a coupling mechanism 24, preferably a coupling mechanism 24 based on a key lock principle. For example, the instrument tip 20 has a mainly cylindrical base body 23 at its end being opposite to the pointed end 25, which is used for removing tartar and/or plaque, and the base body 23 comprises a key lock region 23' having a preferably non-circular cross section. This lock region 23' having a different cross section interacts with a corresponding recess in the base element 2 at the second front side 22 for forming the coupling mechanism 24. In particular, it is provided that the instrument tip 20 is inserted into the hole, i. e. the receiving region 15, by entering the hole at the second front side 22. The instrument tip 20 might be fixed to the torque wrench 1 via a clip or a magnet.

To limit the risk of an injury, it is provided that the second front side 22 of the base element 2 has the guiding structure 4 for aligning the instrument tip 20 during inserting the instrument tip 20 into the torque wrench, in particular the receiving region 15. In particular, the torque wrench 1 is moved towards the receiving region 15, for example manually, and the guiding structure 4 shifts the torque wrench 1 and/or the instrument tip 20 laterally. The guiding structure 4 is preferably realized by a corresponding curvature, for example concave curvature, of the second front side 22 of the torque wrench 1. In particular, the guiding structure 4 forms an opening that tapers along a direction parallel to the insertion direction D, in particular in a direction pointing to the first front side 21 of the torque wrench 1. In particular the insertion direction D corresponds to a longitudinal direction of the receiving region 15.

Furthermore it is conceivable that the guiding structure 4 is concentric to the base body 23 of the instrument tip 20 extending from the second front side 22, when the torque wrench 1 is equipped with the instrument tip 20. For example, the guiding structure 4 forms a funnel or chute. Preferably, the guiding structure 4 has a first height H1 extending parallel to the insertion direction D and a relation between the first height H1 and the whole height H2 of the base element 2 measured along the insertion direction D has a value between 0.1 and 0.5, preferably between 0.15 and 0.4 and more preferably between 0.2 and 0.3.

Moreover, it is preferably provided that the torque wrench 1 is individualized to a certain type of instrument tip 20 and/or a certain sub-ensemble of types of instrument tips 20. This might be realized by adapting the receiving region 4, i. e. the hole, corresponding to an outer surface of the instrument tip 20, in particular the outer surface of the base body 23 of the instrument tip 20. As a consequence, it is possible to label the torque wrench 1 with an individual identification that identifies the type of the instrument tip 20 being installed at the torque wrench 1. For example, a name of the instrument tip 20 is engraved into a portion of the base element 2 of the torque wrench 1 being visually ascertainable, such as the first front side 21. It is also conceivable that the base element 2 has a color code, wherein each color or color combination is assigned to a specific type of instrument tip 20.

Further, the identification of the instrument tip 20 being inserted into the torque wrench 1 is supported by a transparent housing 10 that surrounds the part of the instrument tip 20 extending or protruding from the first front side 21 of the base element 2. Due to the transparent housing 10 it is advantageously possible to simultaneously protect the instrument tip 20, in particular the part of the instrument tip 20 that extends from the first front side 21 and that is thinner than the base body 23 of the instrument tip 20, and see and identify the instrument tip 20. Preferably, it is provided that the housing 10 has a shape being concentrically to the base element 2 of the torque wrench 10 and/or the hole forming the receiving region 15. Furthermore, the housing 10 has an inner surface 11 and an outer surface 12, wherein at least in a primary region 31 extending from the first front side 21 of the base element 2 to the end 25 of the instrument tip 20 the inner surface 11 and the outer surface 12 are fully or completely parallel to each other. Preferably, the primary region 31 extends from the first front side 21 of the base element 2 to the end 35 of the housing 10 in a direction perpendicular to the first front side 21 or parallel to the insertion direction D. It is also conceivable that primary region 31 extends over the whole housing 10. Realizing the inner surface 11 and the outer surface 12 of the housing 10 completely cylindrically and parallel to each other means that there no deformation incorporated into the housing 10 that usually are intended to simplify gripping of the housing 10 and therefore the torque wrench 1. It is also conceivable that the housing 10 has at least one deformation in a secondary region 32 of the housing 10, wherein the secondary region 32 extends from the first front side 21 to at least the second front side 22 of the base element.

In particular, it is provided that a first length L1 is assigned to the primary region 31 extending from the base element 2 at least to the end 25 of the instrument tip 20, preferably exactly to the end 25 of the instrument tip 20, and a second length L2 is assigned to a maximal distance of an opening defined by the inner surface 11, wherein the second length L2 is larger than the first length L1, in particular the second length L2 is 1 to 6 times, preferably 1.2 to 2.5 times and more preferably 1.3 to 1.8 times bigger than the first length L1. These dimensions and in particular a first front side 21 corresponding to the opening, simplifies taking a look from above on the instrument tip 20. Further, it is possible to provide information of the used instrument tip 20 on the first front side 12 of the base element 2 being comparable large. Preferably, the secondary region 32 has a third length L3 being smaller than the first length L1, preferably 1.5 to 5 times smaller.

Figure 4:
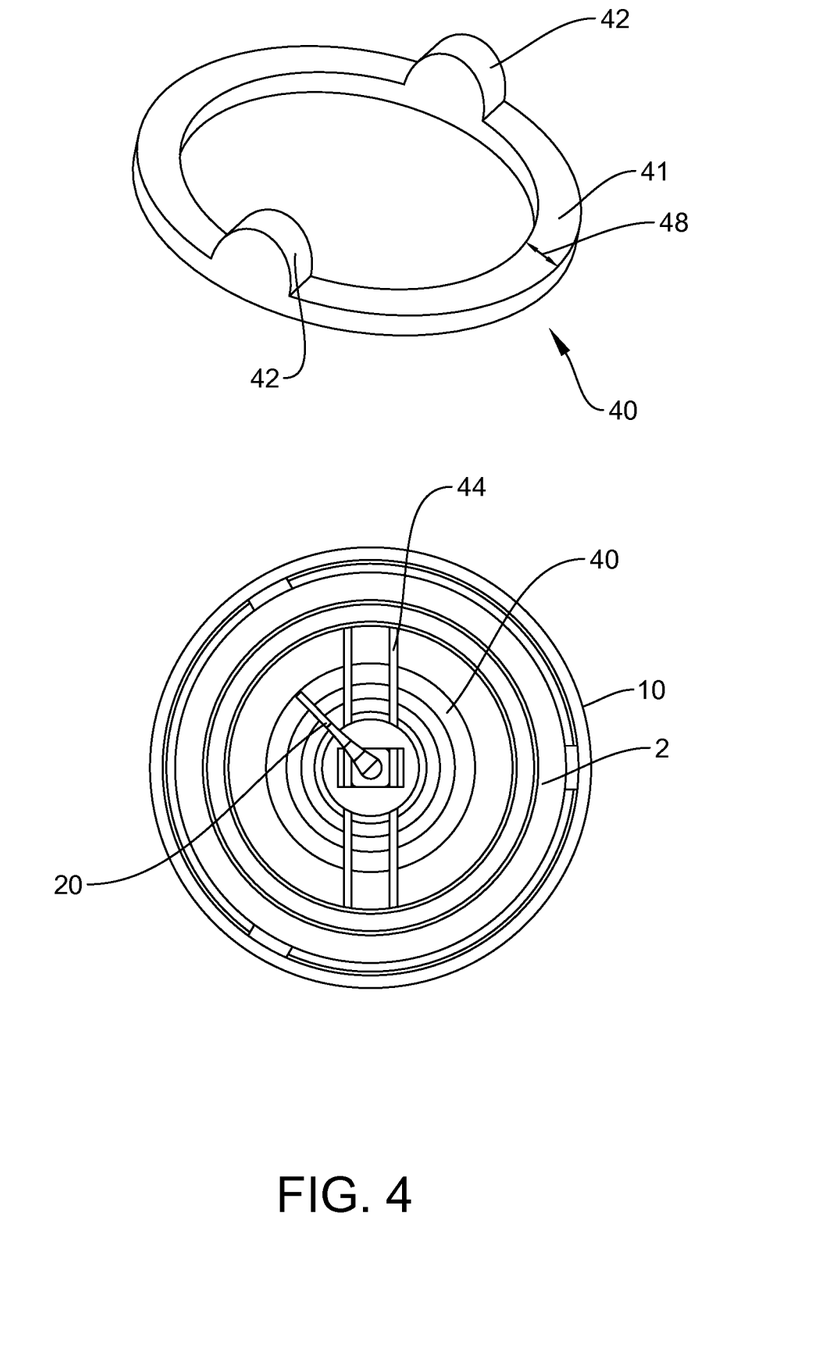
FIG. 4 shows a component suitable for being mounted on the torque element of the FIGS. 1 to 4 or to another torque wrench.

In FIG. 4 a component suitable for being mounted on the torque element 1 of the FIGS. 1 to 3 or to another torque wrench 1 is shown. In particular, the component is shown isolated from the torque wrench 1 (top) as well as mounted on the torque wrench 1 (bottom). The component mainly comprises a ring 41, in particular a ring 41 made from plastic that is placed concentrically onto the first front side 21 of the base element 2, in particular concentrically to the receiving region 15 and/or the base body 23 of the instrument tip 20 being equipped to the torque wrench 1. For mounting the ring 41 at the first front side 21, the ring 41 comprises protrusions 42 for realizing a force and/or form fitting fixing. In the embodiment presented in FIG. 4 the protrusions 42 corresponds to an arc shaped or circular curvature extending perpendicular to the plane of the ring 41 and the two protrusions 42 are arranged opposite to each other. In the mounted state each of the protrusions 42 is located between two bridging member 44 such that the protrusions 42 are jammed or clipped between the bridging members 44 that mainly extend parallel to the first front side 21. The mounted ring 41 represents a reference marking 40 that can be used to identify the status of the instrument tip 20 being equipped to the torque wrench 1. In particular, a thickness 48 of the ring 41 measured in a radial direction relative to the receiving region 15 represents the reference marking 40 for identifying the status of the instrument tip 20.

The illustration at the bottom side of the FIG. 4 represents a top view on the torque wrench 1 being equipped with the ring 41 and the instrument tip 40. The instrument tip 40 is orientated in a predefined way. For example the shape of the base body 23 of the instrument tip 20, i. e. its non-circular cross section, and the corresponding recess at the second front side 22 of the base element 2 pre-defines the orientation of the end 25 of the instrument tip 20. In a case of a squared cross section, there are for example four orientation of the instrument tip 20 extending from the first front side 21 possible.

For identifying the status of the instrument tip 20, in particular its length, a user places the torque wrench 1 for example on a horizontal plane, such as a table or try, and the user can approximate the status from a defined top view perspective. For example the user needs to be placed 30 cm from the torque wrench 1. Thus, it is possible to use the reference marking 40 when projecting the instrument tip 20, in particular its end 25, onto the first front side 21 having the ring 41. For example, the projection of the instrument tip 20 onto the first front side 21 extends to the outer circle of the ring 41, when the instrument tip 20 is new, and the projection of the instrument tip 20 on the first front side 21 ends extending at the inner circle of the ring 41, when the instrument tip 20 is worn at the limit. Consequently, it is possible to verify the length of the instrument tip 20 by a simple visual check, advantageously.

The invention claimed is:

1. Torque wrench for connecting a replaceable instrument tip to a hand piece that carries the replaceable instrument tip in operation, comprising
a base element having a receiving region for placing the instrument tip inside the receiving region at least during connecting the instrument tip to the hand piece,
a torque wrench mechanism for applying a certain torque when connecting the instrument tip to the hand piece and
a housing surrounding the instrument tip, when the instrument tip is arranged in the receiving region, wherein the torque wrench has a guiding structure for aligning the instrument tip during inserting the instrument tip into the receiving region, and
wherein the guiding structure tapers along a direction being parallel to a longitudinal direction of the receiving region, and
wherein the torque wrench has a reference marking for determining a status of the instrument tip when connected to the receiving region the reference marking is a ring extending concentrically to an inner surface when the ring is placed concentrically onto a first front side of the base element.

2. Torque wrench according to claim 1, wherein the housing has an inner surface and an outer surface being parallel to each other over a complete primary region extending from the base element to at least an end of the instrument tip, when the torque wrench is equipped with the instrument tip, when the instrument tip is arranged in the wrench.

3. Torque wrench according to claim 1, wherein a first length is assigned to a primary region extending from the base element to at least the end of the instrument tip and a second length is assigned to a maximal width of an opening defined by an inner surface, wherein the second length is larger than or equal to the first length.

4. Torque wrench according to claim 3, wherein the housing has a secondary region surrounding the base element, wherein a third length is assigned to the secondary region, that is smaller than a complete height of the base element.

5. Torque wrench according to claim 1, wherein the torque wrench is individualized for connecting to a certain type of instrument tip.

6. Torque wrench according to claim 5, wherein the torque wrench has an identification for visually identifying the instrument tip being inserted in the torque wrench.

7. Torque wrench according to claim 1, wherein the housing is at least partially free from deformations.

8. Torque wrench according to claim 1, wherein the torque wrench is made from a material being compatible with a sterilization method used for sterilizing the instrument tip.

9. System comprising a torque wrench according to claim 1 and a replaceable instrument tip for a hand piece that carries the replaceable instrument tip in operation.

10. System according to claim 9, wherein the hand piece comprises an activator unit for activating a movement of the instrument tip connected to the hand piece and/or a cooling unit.

11. Torque wrench according to claim 1, wherein the housing is transparent.

12. Torque wrench according to claim 1, wherein the guiding structure has a concave shape.

13. Method for connecting a replaceable instrument tip and a hand piece that carries the replaceable instrument tip in operation by using a torque wrench according to claim 1, comprising
locating the replaceable instrument tip inside the receiving region of the torque wrench and/or
connecting and/or disconnecting the replaceable instrument tip and the hand piece by applying a certain torque defined by the torque wrench.

* * * * *